INVENTOR
STEPHEN NICHOLAS SPENS

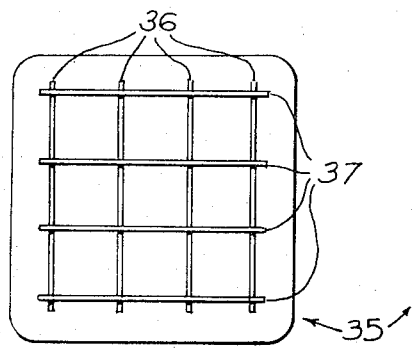
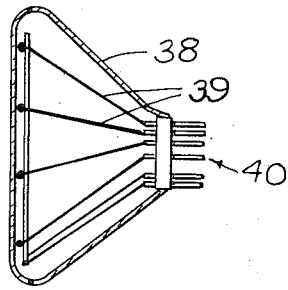
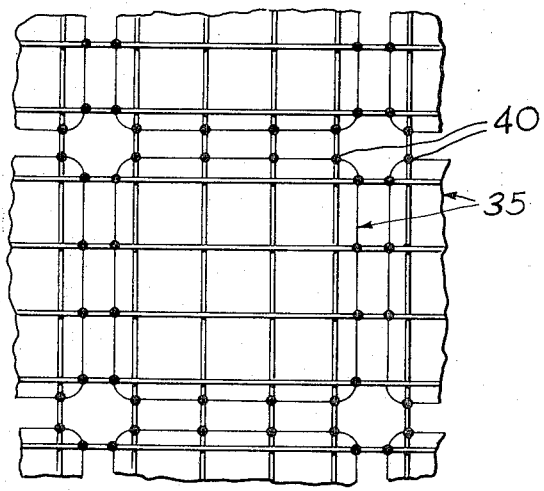

United States Patent Office 3,351,937
Patented Nov. 7, 1967

3,351,937
DATA-DISPLAY APPARATUS
Stephen Nicholas Spens, Farnborough, England, assignor to The Solartron Electronic Group Limited, Farnborough, Hampshire, England, a corporation of Great Britain
Filed Aug. 1, 1966, Ser. No. 569,409
Claims priority, application Great Britain, Aug. 6, 1965, 33,851/65
17 Claims. (Cl. 343—5)

ABSTRACT OF THE DISCLOSURE

A source of data relating to the positions of objects is referenced to a first set of co-ordinates. The set of co-ordinates lie in a substantially horizontal reference plane fixed relative to the earth and encompasses the source of the data, for instance, a radar scanner. A computer receives as one input the data from the source. A slide mounted in the slide holder of an optical projector bears a chart of an area lying in the reference plane. An image of the chart is projected by the optical projector onto a matrix of light cells and brought into registry with these light cells. The chart is coded, the code sensed and converted into a coded signal which is supplied as a second input to the computer. The computer, in response to both inputs, computes the positions of light cells that have the same positional relationship to the chart that the objects within the field of scan of the radar scanner have to the first set of co-ordinates. Visual indications of the computed positions of the light cells is provided through illumination of such cells.

---

The present invention relates to data-display apparatus and is concerned with the display of co-ordinate-dependent data such as, for example, radar information.

In radar systems and other co-ordinate-dependent data-display systems it is known to combine on the face of a cathode ray tube the display of signals which denote the directions or positions of objects with symbols which identify the objects. The symbols are produced by cathode rays and are directed to a determined part of a display screen. Such a combined display will be referred to as a Tac Display.

It is known in a Tac Display to cause the position of a symbol to move with the display of the object with which it is identified. To do this it is usual to employ a computer in which information relating to say the position of the object and to the allocated symbol is stored and up-dated and in which time derivatives of the objects movement are calculated.

In using a Tac Display it is required to derive from it, for example, map-grid references but because of the unavoidable distortions in the Tac Display a grid for superimposition on the Tac Display must be generated with the same distortions in it.

It is known to employ in association with a Tac Display a second display which is referred to as the Tote Display. In the Tote Display there is manually-inserted information about objects on the Tac Display such information being more detailed than in the symbols in the Tac Display. The Tote Display is in rows of alphanumerical characters.

To excite a row of the Tote Display it is known to position a photo-sensitive device (photo-pencil) over a Tac Display in register with the display of an object, the photo-pencil being responsive to the initial flash of the "bright-up" of the phosphor on the cathode ray tube. The instant occurrence of the flash and its co-ordinates in the Tac Display determine the information displayed in the Tote Display.

The Tote Displays have been found satisfactory but for some purposes the limitations of the Tac Displays have been troublesome especially the impossibility of enabling a detailed map to be accurately superimposed upon the Tac Display.

According to the present invention in combination with a source of data relating to the positions of objects defined with respect to a first set of position co-ordinates there is provided a matrix of electrically controlled light cells arranged in rows in accordance with a second set of co-ordinates, means for superimposing upon the matrix a chart defined in accordance with the first set of co-ordinates, and means responsive to position data from the said source for causing light cells in the said matrix to be electrically excited and emit light at co-ordinate positions bearing to the chart the same relation as the objects to the first set of co-ordinates. The matrix of light cells is preferably provided by a panel of electroluminescent cells with co-ordinate control for the different cells and can have an array of any desired size which will usually be between 100 x 100 and 1000 x 1000 cells. The means for superimposing the chart upon the matrix will usually be an optical projector. To obtain registration of the chart upon the matrix at least three registration points can be provided on each of, say, three different corners. In this way account can be taken of scale and skew and registration may be effected manually or by servo mechanism with an optical sensor acting on the projector. Alternatively the optical sensor may be employed to cause the computor to shift appropriately the relative scale of its output signals over the necessary small range.

Transparent slides of chart of different scales and/or different datum co-ordinates may be coded so as automatically to send to the computer a signal to determine the scale or co-ordinates over a wide range.

The invention will now be further described by way of example with reference to the accompanying drawings in which:

FIG. 6 illustrates a portion of an electroluminescent panel formed by an array of interconnected glow lamps.

Figure 1:
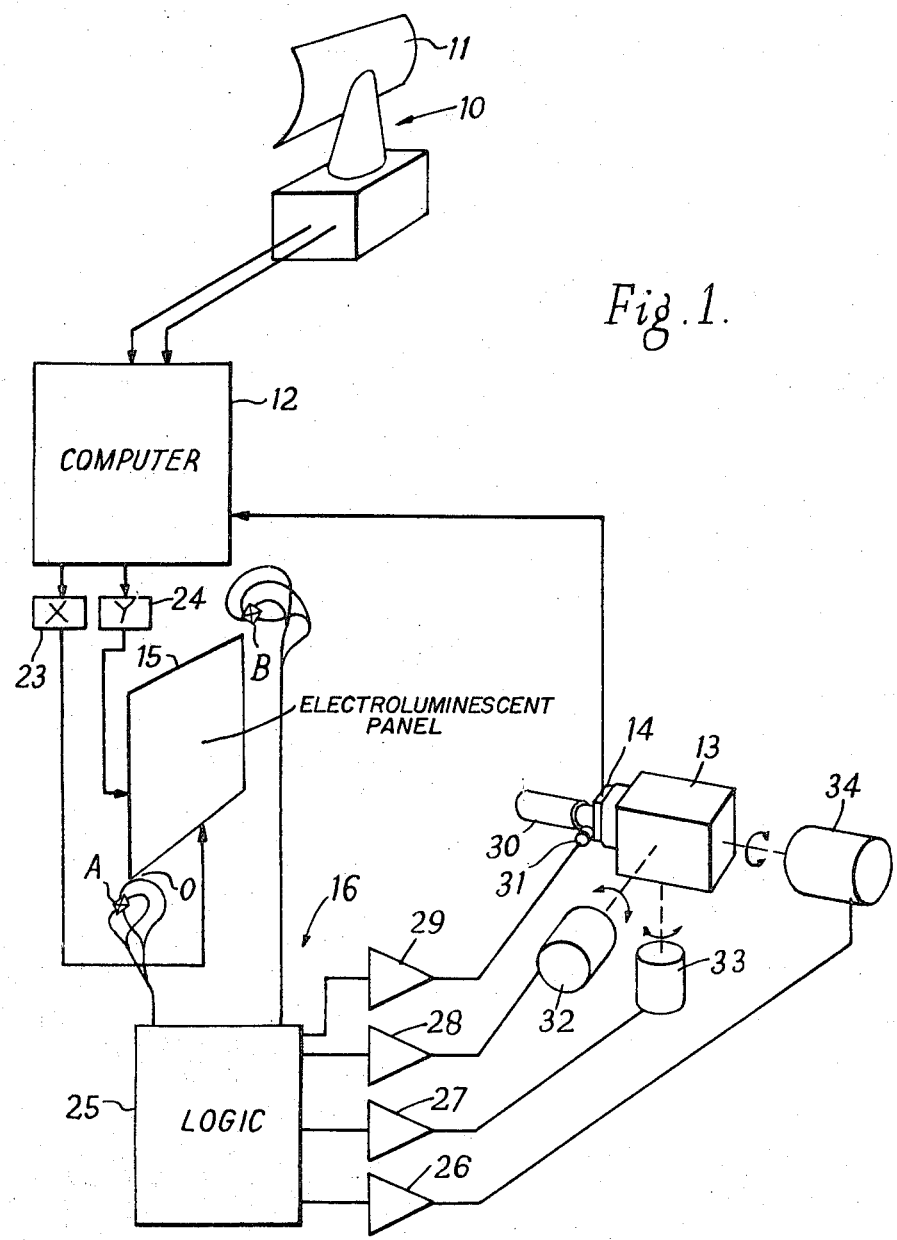
FIG. 1 is a schematic view of a radar system embodying the present invention.

Referring to FIG. 1, there is shown a radar installation 10 which serves as a source of data relating to the positions of objects as defined by a first set of co-ordinates in a substantially horizontal reference plane fixed relative to the earth and passing through the scanner 11 of the radar installation.

In operation, the radar installation supplies such data to a computer 12. A slide, not shown, in the slide holder 14 of an optical projector 13 bears a chart of an area lying in the reference plane and is formed with a code which is sensed by the slide holder 14 which thereby supplies a signal representing the code to the computer 12. An image of the chart is projected by the optical projector on to a planar square matrix of electrically controlled light cells comprising a panel of electroluminescent cells 15. The image of the chart is brought into registry with the panel 15 by means of four servo loops indicated by a general reference 16.

The computer 12, in response to the data from the radar installation 10 and the signal representing the code on the slide in the slide holder 14, computes the positions of light cells in the panel 15 bearing to the image of the chart the same relation as objects within the field of scan of the scanner 11 bear to the first set of co-ordinates, and causes cells at the computed positions to be electrically excited and so to emit light. Such positions in the panel 15 are defined by pairs of co-ordinates in a second set of co-ordinates, the light cells of the panel 15 being arranged in rows in accordance with the second set of co-ordinates.

Figure 2:
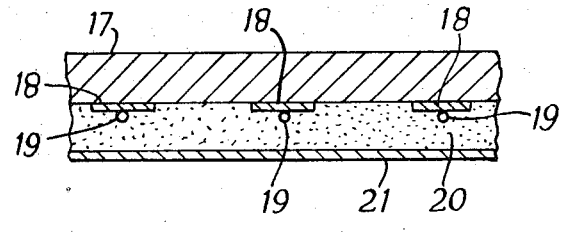
FIG. 2 is an enlarged fragmentary sectional view of the matrix of FIG. 1.

Referring to FIG. 2, there is shown a fragmentary sectional view of the panel 15, the section being taken parallel to a co-ordinate in the second set of co-ordinates, which are rectangular Cartesian co-ordinates. A sheet 17 of transparent material is coated on its face remote from the optical projector 13 with mutually parallel strips 18 of a translucent conductor, for example very thin strips of metal film. A respective fine metal wire 19 lies in electrical contact and parallel to each strip 18 and serves to prevent a loss of potential along the respective strip 18. A coating 20 of an electroluminescent salt is applied over the strips 18 and wires 19. Mutually parallel strips of metal foil are arranged at right angles to the strips 18, one such strip of metal foil being partially shown in longitudinal section at 21. Each cell of the panel 15 is actuated at the crossing of a respective pair of mutually perpendicular strips, for example as at 22 in FIG. 3, in operation light being emitted by the cell from the coating 20 at the respective crossing. The wires 19 are of sufficiently small diameter as not to obscure excited cells. Thus each strip defines an ordinate or an abscissa of the second set of co-ordinates.

Referring again to FIG. 1, in operation, when the radar installation 10 senses an object in the reference plane, the computer 12 supplies two output signals representing a pair of the second co-ordinates defining the position of a cell of the panel 15 to two gating networks 23 and 24 respectively. The gating network 23 includes a plurality of electrical gating circuits referred to hereinafter as X gates, each X gate being coupled to a respective translucent strip of the panel 15, and the gating network 24 includes a plurality of electrical gating circuits, referred to hereinafter as Y gates, each Y gate being coupled to a respective strip of metal foil of the panel 15. In accordance with the output signals from the computer 12, an X gate and a Y gate are so actuated as to apply pulses of electrical potential to their respective strips in the panel 15 and thereby cause the cell in the panel 15 defined by the crossing of these strips to emit light. Continuous visibility of an excited cell can be obtained by a suitable choice of electroluminescent material for the coating 20 in co-operation with persistence of vision in an observer. If necessary, additional phosphorescent material can be associated with each cell.

The data supplied, in operation, by the radar installation 10 to the computer 12 comprises two types of data referred to herein as constant data and variable data. The constant data consists of a signal representing a pair of numbers representing the position of the scanner 11 as defined by the first set of co-ordinates, which are rectangular Cartesian co-ordinates. In the present example, the pair of numbers represent easting and northing. The variable data consists of signals representing pairs of polar co-ordinates, each pair representing the range and azimuth of a point on an object sensed by the radar installation.

The radar installation 10 includes means, not shown, for standardising the scale of the scan and the orientation of the scanner 11 to due North. In another embodiment including a radar installation without such means for standardising, further constant data representing the scale of the scan and the orientation of the scanner to due North is supplied to a computer for standardising thereby.

The computer 12 is adapted to continuously transform the variable data it receives in operation from the radar installation 10 from polar co-ordinate form into a corresponding rectangular Cartesian co-ordinate form.

The code on a slide in the slide holder represents the position of a reference point on the slide as defined by the first set of co-ordinates, the reference point being considered as part of the chart borne by the slide, and the scale of the slide. A plurality of slides, each bearing a different chart, are intended for use in the slide holder 14 and the positions of the reference points on their respective slides are identical.

The position of the reference point on each slide for use in the apparatus of FIGURE 1 is such that when the image of the chart on the slide is projected by the optical projector 13 onto the panel 15, the reference point effectively falls at the origin O shown in FIGURE 1 of the second set of co-ordinates.

When a slide is placed in the slide holder 14, the computer 12 subtracts the abscissa of the reference point of the slide from the abscissa of the position of the scanner 11, and subtracts the ordinate of the reference point of the slide from the ordinate of the scanner 11, thus computing an abscissa constant and an ordinate constant respectively which are stored in the computer 12. On having computed the Cartesian co-ordinates of a point on an object sensed by the scanner 11, the computer adds the abscissa constant to the abscissa of the said point and the ordinate constant to the ordinate of the said point. The computer then divides each of the resulting numbers by the scale of the chart on the slide, thereby obtaining a pair of numbers which define the position of the said point in the second set of co-ordinates, the scale of the slide being the number obtained by dividing the number of cells along a side of the panel 15 by the number of units of the first set of co-ordinates, as embodied in the image of the chart borne by the slide projected by the optical projector 13 onto the panel 15, occupying the same distance. In accordance with the pair of numbers the computer 12 supplies an output signal to the gating circuit 23 and an output signal to the gating circuit 24 whereby to actuate an appropriate X gate and an appropriate Y gate. Thus a cell on the panel 15 at the position bearing to the image of the chart the same relation as the said point on an object sensed by the scanner 11 is electrically excited.

It has been found that it is convenient if the scales of a plurality of slides for use in the apparatus of FIGURE 1 are related to one another by integral powers of two.

Each slide is very accurately made and fits in the slide holder 14 with closer tolerances than those necessary for a conventional optical projector.

The four servo loops 16 comprise two sensing arrays A and B in alignment with a diagonal of the panel 15, logic circuitry 25 embodying four comparators, four amplifiers 26, 27, 28 and 29 and four reversible motors 31, 32, 33 and 34, of which one 31 drives a zoom lens 30. The motors 32, 33 and 34 are so coupled to the optical projector 13 as, in operation, to be able to cause an image of a chart to move parallel to each set of strips of the panel 15 and to rotate about the centre of the panel 15.

The size of an image of a chart can be increased and decreased by actuation of the motor 31 to vary the setting of the zoom lens 30.

Figure 3:
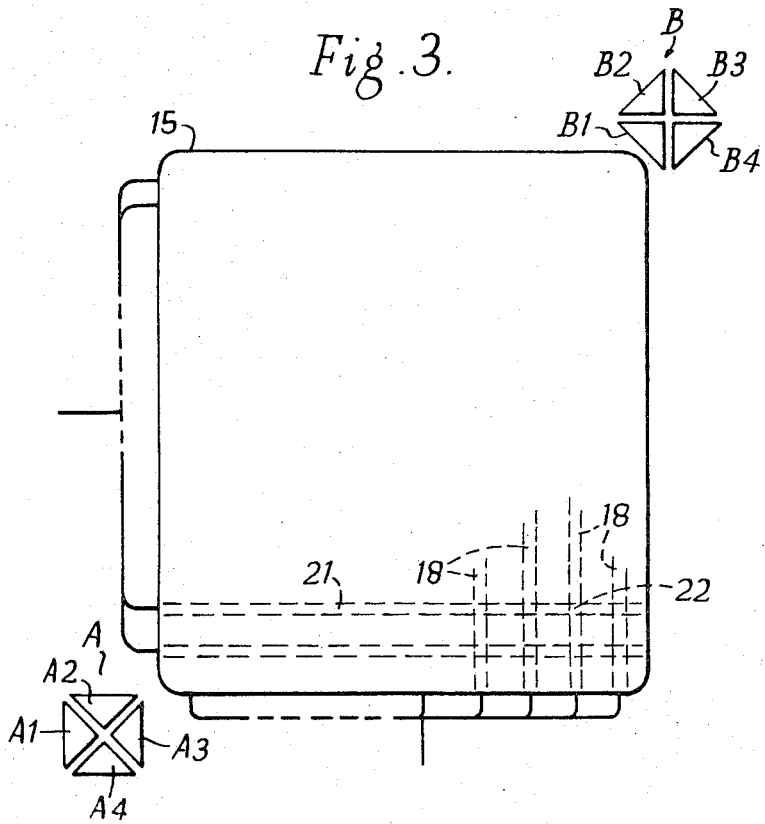
FIG. 3 is a schematic view of the matrix and registration sensors of the radar system of FIG. 1, FIGS. 4 and 5 illustrate end and side views, respectively, of a conventional glow lamp which may be utilized by the instant invention.

Referring to FIGURE 3, the sensing arrays A and B each comprise four triangular areas, A1 A2 A3 and A4, and B1 B2 B3 and B4 respectively, of photosensitive material arranged in the form of a Maltese cross, the arms of the cross formed by the array A being parallel to the sides of the panel 15 and the arms of the cross formed by the array B being parallel to the diagonals of the panel 15.

Each photosensitive area is adapted to provide an electrical signal indicative of the proportion of its area illuminated. Each pair of opposite areas, for example, A1 and A3, is coupled to a respective comparator in the logic circuitry 25. In operation, each comparator supplies an error signal to a respective one of the amplifiers 26, 27, 28 and 29, which is representative of the excess of the proportion illuminated of one area over the proportion illuminated of the other area, and of which the polarity indicates to which area the larger proportion illuminated belongs. The respective amplifier, in response to an error signal, causes the rotor of the respective motor to rotate clockwise or counterclockwise in dependence upon the polarity of the error signal.

Each slide is adapted to cause the optical projector 13 to project two circular spots of light which, when the image of the chart borne by the slide is in register with the matrix of cells of the panel 15, so fall onto the two arrays A and B respectively as to illuminitae equal proportions of each of the triangular photosensitive areas.

If a larger proportion of the area A1 is illuminated than of A3, the comparator coupled to the areas A1 and A3 provides an error signal which causes the motor 33 to rotate the optical projector in such a direction as to increase the proportion illuminated of the area A3, and vice versa. Similarly, the areas A2 and A4 actuate the motor 32, the areas B2 and B4 actuate the motor 34, and the areas B1 and B3 actuate the motor 31.

In operation, the four servo loops can function continuously and simultaneously to maintain the image of a chart in registry with the matrix of cells of the panel 15 although adjustments actuated by the array A affect the adjustments actuated by the array B.

In other embodiments of the invention which do not include the four servo loops 16, the registration of an image of a chart on the matrix can be effected manually.

The code on a slide for use in the slide holder 14 is in the form of dark and light areas on the slide which are not projected by the optical projector 13 but sensed by an optical sensor in the slide holder 14. The optical sensor is adapted to supply a signal representative of the code to the computer 12.

In other embodiments in which slides are used, the code on each slide can be in the form of electrical contacts or mechanical registrations on the periphery of the slide, or of punched holes in a card secured to the slide, appropriate electrical, or electromechanical sensing means in the associated slide holder being employed.

In one embodiment of the invention, the matrix of cells comprises an array of glow lamps, each lamp having two sets of ten mutually parallel wires, the wires of one set being arranged at right angles to the wires of the other set to provide in operation one hundred crossings of pairs of wires at which a glow discharge can occur. Thus each glow lamp comprises one hundred electrically excitable light cells of the matrix. In operation an appropriate pair of wires is selected and the cell excited in short pulses, an appearance of continuous emission of light being provided by the combined effects of persistence of vision and persistence of light emission.

FIGURES 4 and 5 illustrate a conventional glow lamp 35 formed by a grid of two sets of mutually perpendicular wires, FIGURE 4, each set being designated by the numerals 36 and 37, respectively. Each set of wires is illustrated as comprising four, rather than ten, wires for the purpose of simplifying the drawing. The coincidental application of voltage to one or more wires of each grid set causes the point of intersection of wires receiving the voltage to glow visibly. The two sets of wires, FIGURE 5, are mounted in a conventional envelope 38 containing a suitable inert gas, the viewing end of the envelope being formed with a generally square transparent front plate. The opposite end of the glow lamp is constructed as an assemblage of contact pins designated generally by the numeral 40. The pins 40 are individually connected to different wires of the grid by leads 39.

FIGURE 6 illustates in one plane the terminal connections between the contact pins 40 of adjacent glow lamps forming a glow lamp array, these terminal connections being depicted as points on the periphery of the transparent front plate of each glow lamp.

It will be apparent the matrix can be constructed with other forms of light cell, for example incandescent lamps or discharge tubes.

The display provided by the invention can be used with a Tac Display or with a Tac and Tote Display.

A photo-pencil associated with the Tac Display can be used to elicit a symbol on the matrix display or to cause a chosen object displayed on the matrix display to occult.

An advantage of the invention in relation to marking of displayed objects by say a chinagraph pencil is that the matrix display can be marked leaving the Tac Display uncluttered. The chinagraph markings may be made upon an edge-illuminated glass panel in front of the matrix display. The combination of any two or all of the displays, chart and markings can be photographed or transmitted by television or facsimile to a distance. Furthermore electroluminescent phosphors can be caused to emit light of different colours whereby objects of different classes can be distinguished by the colour of the emitted light.

What is claimed is:

1. Data-display apparatus comprising a source of data relating to the positions of objects defined with respect to a first set of position co-ordinates,
   a matrix of electrically controlled light cells arranged in rows in accordance with a second set of co-ordinates,
   means for superimposing upon the said matrix a chart defined in accordance with the said first set of co-ordinates,
   and means responsive to position data from the said source for causing light cells in the said matrix to be electrically excited and emit light at co-ordinate positions bearing to the chart by same relation as the objects to the said first set of co-ordinates.

2. Apparatus as claimed in claim 1, wherein the said matrix comprises a panel of electroluminescent cells.

3. Apparatus as claimed in claim 2, wherein the said panel comprises a sheet of transparent material, a first plurality of parallel strips of translucent conductive material on one face of the said sheet, a coating of electroluminescent material over the said first plurality of strips, and a second plurality of parallel strips of conductive material, the said pluralities of strips defining the said second set of co-ordinates.

4. Apparatus as claimed in claim 3, including a plurality of parallel wires, each wire lying in electrical contact with along the length of and paralell to a respective one of the said translucent strips.

5. Apparatus as claimed in claim 1, wherein the said matrix comprises an array of glow tubes, each glow tube having a plurality of electrodes so arranged as to be capable of establishing glow discharges at discrete points in the respective glow tube.

6. Apparatus as claimed in claim 1, wherein the said means for superimposing upon the said matrix a chart, comprises an optical projection.

7. Apparatus as claimed in claim 6, including a slide bearing a chart for projection, in operation, by the said optical projector onto the said matrix, the slide including an optical code for transmission to the said means responsive to position data.

8. Apparatus as claimed in claim 7, including at least one servo loop adapted to sense and adjust the position of a chart projected by the said optical projector onto the said matrix.

9. Apparatus as claimed in claim 8, wherein the said optical projector is provided with a zoom lens, and including a servo loop adapted to sense and adjust the size of a chart projected by the said optical projector.

10. Apparatus as claimed in claim 1, wherein the said source of data relating to the positions of objects comprises a radar installation including a radar scanner.

11. Apparatus according to claim 1, wherein the said second set of co-ordinates is a set of rectangular Cartesian co-ordinates and the said means responsive to position data comprises a plurality of pairs of electrical gating circuits, each of said pairs being adapted to excite a respective cell of the said matrix.

12. Data-display apparatus comprising a radar installation including a radar scanner, said installation being adapted to supply data relating to the positions of objects defined with respect to a first set of position co-ordinates, a matrix of electrically controlled electroluminescent cells arranged in rows in accordance with a second set of co-ordinates, an optical project or for superimposing upon the said matrix a chart defined in accordance with the first set of co-ordinates;

and computing means responsive to position data from the said radar installation for causing light cells in the said matrix to be electrically excited and emit light at co-ordinate positions bearing to the chart the same relation as the objects to the said first set of co-ordinates.

13. Apparatus as claimed in claim 12, wherein the said means for superimposing a chart upon the said matrix a chart includes at least one servo loop adapted to sense and adjust the position of a chart superimposed, in operation, on the said matrix.

14. Apparatus as claimed in claim 13, wherein the said means for superimposing a chart upon the said matrix comprises an optical projector.

15. Apparatus as claimed in claim 14, wherein the said servo loop includes photosensitive sensing means.

16. Apparatus as claimed in claim 12, wherein the said matrix comprises a panel of electroluminescent cells.

17. Apparatus as claimed in claim 16, wherein the said panel comprises a sheet of transparent material, a first plurality of parallel strips of translucent conductive material on one face of the said sheet, a coating of electroluminescent material over the said first plurality of strips, and a second plurality of parallel strips of conductive material, the said pluralities of strips defining the said second set of co-ordinates.

References Cited

UNITED STATES PATENTS

| | | | |
|---|---|---|---|
| 2,954,427 | 9/1960 | Covely et al. | 343—5 |
| 3,048,821 | 8/1962 | Burstow, et al. | 315—169 X |
| 3,098,173 | 7/1963 | Livingston | 313—108 |
| 3,134,297 | 5/1964 | Carlson et al. | 88—24 |

FOREIGN PATENTS 493,502  6/1953  Canada.

RODNEY D. BENNETT, *Primary Examiner.*

C. L. WHITMAN, *Assistant Examiner.*